(12) United States Patent
Yamane et al.

(10) Patent No.: US 11,262,313 B2
(45) Date of Patent: Mar. 1, 2022

(54) SULFUR CHEMILUMINESCENCE DETECTOR

(71) Applicant: Shimadzu Corporation, Kyoto (JP)

(72) Inventors: Masashi Yamane, Kyoto (JP); Shigenobu Nakano, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 208 days.

(21) Appl. No.: 16/691,672

(22) Filed: Nov. 22, 2019

(65) Prior Publication Data

US 2020/0249170 A1 Aug. 6, 2020

(30) Foreign Application Priority Data

Feb. 1, 2019 (JP) .............................. JP2019-017208

(51) Int. Cl.
*G01N 1/00* (2006.01)
*G01N 21/76* (2006.01)
(Continued)

(52) U.S. Cl.
CPC .............. *G01N 21/76* (2013.01); *B01L 3/508* (2013.01); *B01L 5/00* (2013.01); *B01L 7/00* (2013.01);
(Continued)

(58) Field of Classification Search
None
See application file for complete search history.

(56) References Cited

U.S. PATENT DOCUMENTS

2006/0144700 A1* 7/2006 Carson .................. C25B 9/17
204/252

FOREIGN PATENT DOCUMENTS

JP 2015-59876 A 3/2015

OTHER PUBLICATIONS

Office Action dated Jan. 18, 2022 issued in the corresponding Japanese patent application No. 2019-017208 (with English machine translation), 8 pages.

(Continued)

*Primary Examiner* — Jyoti Nagpaul
(74) *Attorney, Agent, or Firm* — Oblon, McClelland, Maier & Neustadt, L.L.P.

(57) ABSTRACT

A sulfur chemiluminescence detector 200 includes: a heating furnace including a gas passage having first and second supply ports, and a heater configured to heat the gas passage; an oxidation-reduction gas supply unit configured to supply, to the gas passage, an oxidizing-agent gas through the first supply port and a reducing-agent gas through the second supply port; a reaction cell configured to make a sample gas that has passed through the gas passage react with ozone; an ozone supply unit configured to supply the ozone into the reaction cell; a vacuum pump connected to the reaction cell; a photodetector configured to detect light generated inside the reaction cell; a signal receiving unit configured to receive a shutdown signal; and a shutdown functioning unit configured to control each unit to automatically stop supplying the reducing-agent gas and the oxidizing-agent gas by the oxidation-reduction gas supply unit, heating the gas passage by the heater, supplying the ozone by the ozone supply unit, and evacuating by the vacuum pump, upon the shutdown signal being received by the signal receiving unit.

6 Claims, 4 Drawing Sheets

(51) Int. Cl.
 *B01L 7/00* (2006.01)
 *B01L 5/00* (2006.01)
 *B01L 3/00* (2006.01)
(52) U.S. Cl.
 CPC ... *B01L 2300/06* (2013.01); *B01L 2300/0627* (2013.01); *B01L 2300/1805* (2013.01)

(56) References Cited

OTHER PUBLICATIONS

Agilent 8355 Chemiluminescent Sulfur Detectors / Agilent 8255 Chemiluminescent Nitrogen-Detectors, User Manual, United States, October, Agilent Technologies, 2015.

* cited by examiner

SULFUR CHEMILUMINESCENCE DETECTOR

TECHNICAL FIELD

The present invention relates to a sulfur chemiluminescence detector.

BACKGROUND ART

The sulfur chemiluminescence detector (SCD) is capable of detecting a sulfur compound in a sample at high sensitivity by using chemiluminescence, and is usually used in combination with a gas chromatograph (GC) (see Patent Literature 1, for example).

Gas (sample gas) containing sample components separated in a column of the GC is introduced in a heating furnace provided in the SCD. The heating furnace includes a combustion tube and a heater for heating the combustion tube. To the combustion tube, an oxidizing agent and a reducing agent are supplied under the control of a flow controller. The sample gas is oxidized by the oxidizing agent while passing through the interior of the combustion tube, and sulfur dioxide ($SO_2$) is generated from a sulfur compound in the sample gas. Then, the $SO_2$ is reduced by the reducing agent while passing through the interior of the combustion tube, and sulfur monoxide (SO) is generated. The SO is introduced into a reaction cell provided downstream of the heating furnace. A vacuum pump is connected to the reaction cell. The vacuum pump is used to suck gas inside the reaction cell, and then ozone ($O_3$) generated in an ozone generator is supplied to the reaction cell. Accordingly, the sulfur monoxide and the ozone react with each other to generate the excited species of sulfur dioxide ($SO_2^*$). When the $SO_2^*$ turns back to the ground state through chemiluminescence, the emission intensity of the $SO_2^*$ is detected by a photodetector, and thus the quantity of the sulfur compound contained in the sample gas is detected from the emission intensity.

CITATION LIST

Patent Literature

Patent Literature 1: JP 2015-059876 A

SUMMARY OF INVENTION

Technical Problem

In the SCD, it is necessary to shut off the power to the entire SCD after an operation called "shutdown" in which a heating furnace, flow controller, vacuum pump, ozone generator, and other devices are stopped in the predetermined order, after the completion of quantitative analysis of sulfur compounds contained in a sample gas. If the order of the shutdown operation is wrong, some parts of the SCD may be contaminated or the next quantitative analysis using the SCD may not be performed in a normal way. In a conventional SCD, an operator manually individually stops each of the units, and thus the burden on the operator who conducts the shutdown operation is extensive.

The present invention has been made in view of this problem. The purpose of the present invention is to simplify the shutdown operation of an SCD.

Solution to Problem

The present invention developed for solving the previously described problem is a sulfur chemiluminescence detector including:

a heating furnace including a gas passage that has a first supply port and a second supply port positioned downstream of the first supply port, and a heating means configured to heat the gas passage;

an oxidation-reduction gas supply unit configured to supply, to the gas passage, an oxidizing-agent gas through the first supply port and a reducing-agent gas through the second supply port;

a reaction cell configured to make a sample gas that has passed through the gas passage react with ozone;

an ozone supply unit configured to supply the ozone into the reaction cell;

a vacuum pump connected to the reaction cell;

a photodetector configured to detect light generated inside the reaction cell;

a signal receiving unit configured to receive a shutdown signal for starting a shutdown operation; and a shutdown functioning unit configured to control the oxidation-reduction gas supply unit, the heating means, the ozone supply unit, and the vacuum pomp, to automatically stop a supply operation for supplying the reducing-agent gas and the oxidizing-agent gas by the oxidation-reduction gas supply unit, a heat operation for heating the gas passage by the heating means, a supply operation for supplying the ozone by the ozone supply unit, and an evacuation operation by the vacuum pump, in response to the shutdown signal being received by the signal receiving unit.

It is preferable for the sulfur chemiluminescence detector to further include:

a temperature sensor configured to detect the temperature of the interior of the gas passage; and a temperature determining unit configured to determine whether the temperature of the interior of the gas passage is lower than the predetermined temperature determination value. It is also preferable that the shutdown functioning unit configured to stop the evacuation operation by the vacuum pump after the supply operation for supplying the ozone by the ozone supply unit is stopped, in response to the determination, by the temperature determination unit, that the temperature of the interior of the gas passage is lower than the temperature determination value.

It is preferable for the sulfur chemiluminescence detector that the ozone supply unit includes an ozone generator, and an oxygen supply unit configured to supply oxygen for generating the ozone to the ozone generator, and the shutdown functioning unit stops the oxygen supplying unit after stopping the ozone generator, so as to stop the supply operation for supplying the ozone by the ozone supply unit.

A program for a sulfur chemiluminescence detector, according to the present invention, is a computer program for controlling operations of a sulfur chemiluminescence detector that includes:

a heating furnace including a gas passage that has a first supply port and a second supply port positioned in a downstream side of the first supply port, and a heating means configured to heat the gas passage;

an oxidation-reduction gas supply unit configured to supply, to the gas passage, an oxidizing-agent gas through the first supply port and a reducing-agent gas through the second supply port;

a reaction cell configured to make a sample gas that has passed through the gas passage react with ozone;

an ozone supply unit configured to supply the ozone into the reaction cell;

a vacuum pump connected to the reaction cell; and a photodetector configured to detect light generated inside the reaction cell, in which the program causes a computer to function as:

a signal receiving unit configured to receive a shutdown signal for starting a shutdown operation; and a shutdown functioning unit configured to control the oxidation-reduction gas supply unit, the heating means, the ozone supply unit, and the vacuum pomp to automatically stop a supply operation for supplying the reducing-agent gas and the oxidizing-agent gas by the oxidation-reduction gas supply unit, a heat operation for heating the gas passage by the heating means, a supply operation for supplying the ozone by the ozone supply unit, and an evacuation operation by the vacuum pump, in response to the shutdown signal being received by the signal receiving unit.

Advantageous Effects of Invention

As mentioned earlier, according to the present invention, when the signal receiving unit receives a shutdown signal, each of the oxidation-reduction gas supply unit, the heating means, the ozone supply unit, and the vacuum pump is controlled to automatically stop the supplying operation for supplying the reducing-agent gas and the oxidizing-agent gas by the oxidation-reduction gas supply unit, the heat operation for heating the gas passage by the heating means, the supply operation for supplying the ozone by the ozone supply unit, and the evacuation operation by the vacuum pump, in a sulfur chemiluminescence detector. Therefore, an operator can easily complete the shutdown of the SCD only by inputting the shutdown signal to the signal receiving unit.

DESCRIPTION OF EMBODIMENTS

Figure 1:
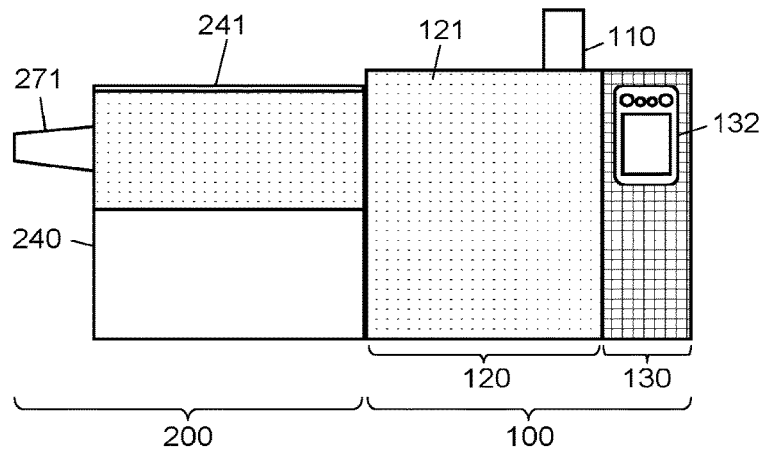
FIG. 1 is a front view showing the appearance of a GC system including an SCD according to an embodiment of the present invention.

A configuration for embodying the present invention is described hereinafter, with reference to the drawings. FIG. 1 is a front view showing the appearance of a gas chromatograph system (GC system) including a sulfur chemiluminescence detector (SCD) according to the present invention.

Figure 2:
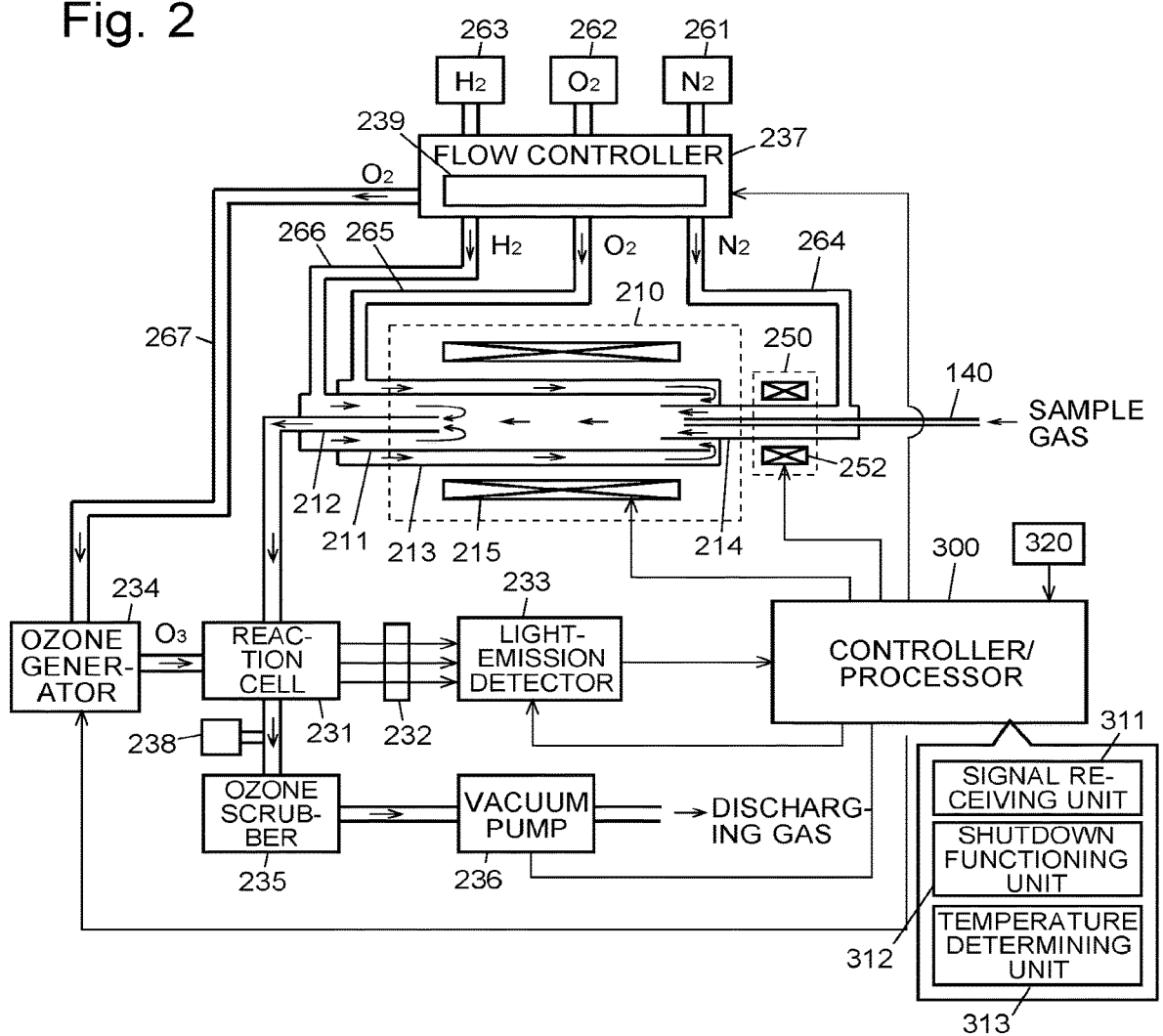
FIG. 2 is a diagram showing the configuration of a main part of the SCD.
Figure 3:
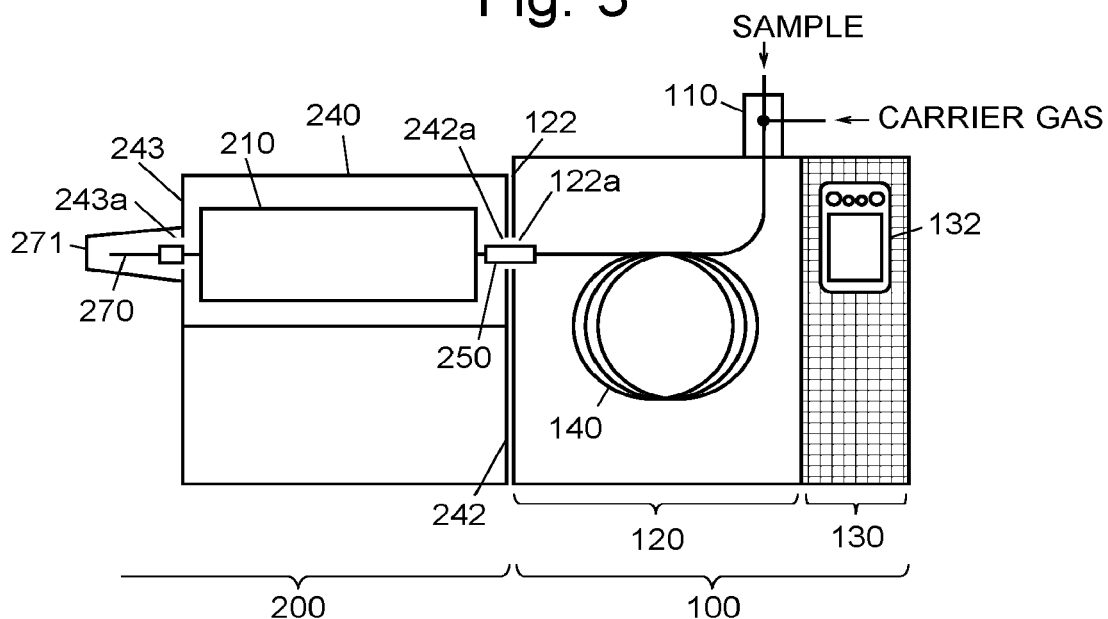
FIG. 3 is a front view schematically showing the inner configuration of the GC system.
Figure 4:
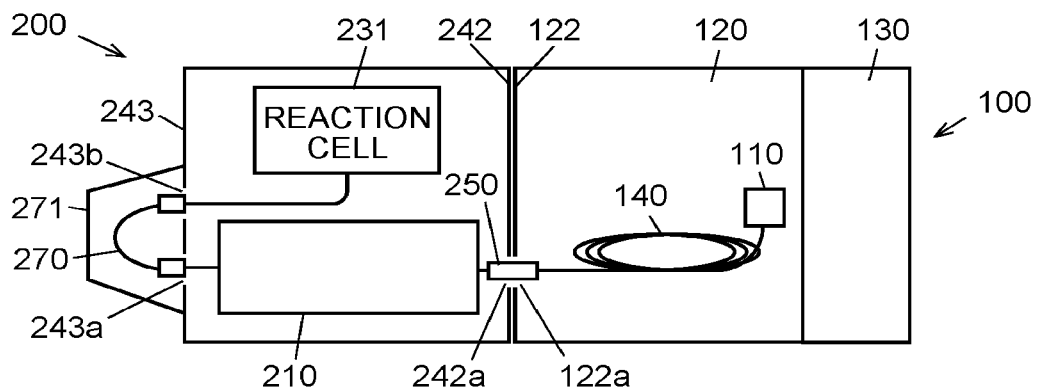
FIG. 4 is a top view schematically showing the inner configuration of the GC system.
Figure 5:
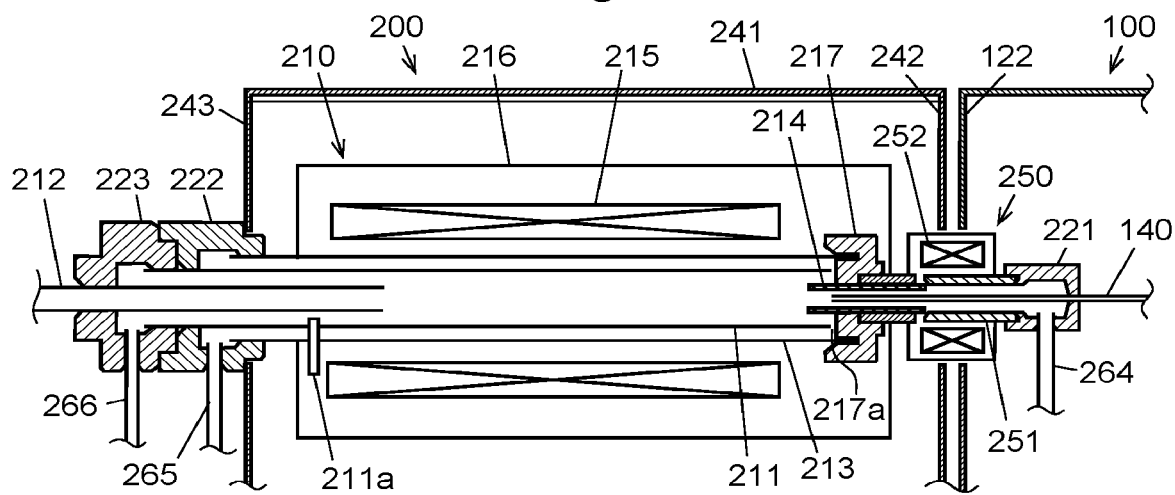
FIG. 5 is a cross sectional view showing the configuration around a heating furnace.

FIG. 2 is a diagram schematically showing the configuration of the SCD according to the present embodiment. FIG. 3 and FIG. 4, which are respectively a front view and a top view, schematically show the inner configuration of the GC system. FIG. 5 is a cross sectional view showing the configuration around a heating furnace of the SCD.

As shown in FIG. 1, the GC system relating to the present embodiment includes a GC 100 and an SCD 200.

The GC 100 includes a sample introduction unit 110, a column oven 120 that contains a column 140 and heats it, and a control-board container 130 in which a control board (not shown) and other units are contained. The front face of the column oven 120 is an openable door 121, and the front face of the control-board container 130 is provided with an operation panel 132.

In the GC 100, a sample is introduced in the flow of a carrier gas in the sample introduction unit 110, and the carrier gas containing the sample is introduced in an inlet end of the column 140 placed inside the column oven 120. The sample is subjected to the separation into each component while passing through the column 140. The gas containing each of the separated components of the sample (hereinafter, referred to as the "sample gas") is sequentially eluted from an eject end of the column 140.

As shown in FIG. 2, the SCD 200 includes: a heating furnace 210; a reaction cell 231 configured to make the gas that has passed through the heating furnace 210 react with ozone; a light-emission detector 233 (corresponding to the "photodetector" of the present invention) configured to detect chemiluminescence generated in the reaction cell 231, through an optical filter 232; an ozone generator 234 configured to generate ozone to be supplied to the reaction cell 231; a vacuum pump 236 configured to evacuate each of the interiors of the reaction cell 231 and the heating furnace 210; an ozone scrubber 235 provided between the reaction cell 231 and the vacuum pump 236, and configured to remove ozone from the gas discharged from the reaction cell 231; a flow controller 237; a control/processing unit 300; and a housing 240 containing the aforementioned units (see FIG. 1). A vacuum gauge 238 configured to measure the degree of vacuum inside the reaction cell 231 is provided in a tube connecting the reaction cell 236 and the ozone scrubber 235. The SCD 200 includes an interface 250 configured to connect the SCD 200 to the GC 100, at the boundary with the GC 100.

As shown in FIGS. 3 and 4, the heating furnace 210 is contained in the SCD 200, at the upper front area of the housing 240 of the SCD 200, and the reaction cell 231 and other units (omitted in FIGS. 3 and 4) are contained in the remaining area inside the housing 240 (for example, below or behind the heating furnace 210). The top face of the area where the heating furnace 210 is contained is a top board 241 (see FIG. 1) that is removable, in the housing 240 of the SCD 200.

As shown in FIG. 5, the heating furnace 210 includes: an exterior combustion tube 211; an interior combustion tube 212; an oxidizing-agent supply tube 213; an inert-gas introduction tube 214; a heater 215 (corresponding to the "heating means" of the present invention); and a housing 216 containing the aforementioned units. The exterior combustion tube 211 and the interior combustion tube 212 correspond to the "gas passage" of the present invention. The exterior combustion tube 211 is provided inside the oxidizing-agent supply tube 213 coaxially with the oxidizing-agent supply tube 213, and the inert-gas introduction tube 214 has one end (left end) that is inserted in the right end of the exterior combustion tube 211. The interior combustion tube 212 is inserted, at its one end (right end), through the left end of the exterior combustion tube 211. The exterior combustion tube 211, the interior combustion tube 212, the oxidizing-agent supply tube 213, and the inert-gas introduction tube 214 are each made of a ceramic, such as alumina. In addition, the oxidizing-agent supply tube 213 is provided with a temperature sensor 211a configured to detect the temperature of the interior of the exterior combustion tube 211.

A connector 217 is attached to the right ends of the oxidizing-agent supply tube 214 and the exterior combustion tube 211. The inert-gas introduction tube 214 is inserted through the connector 217. A groove 217a (corresponding to the "first supply port" of the present invention) is provided in the face of the left end of the connector 217, so that gas can be ventilated between the oxidizing-agent supply tube 213 and the exterior combustion tube 211 via the groove 217a. The inert-gas introduction tube 214 has the right end that protrudes from the housing 216 of the heating furnace 210, and is connected to the left end of a tube 251 provided inside the interface 250 placed on the boundary between the GC 100 and the SCD 200.

The interface 250 includes, in addition to the tube 251, a heater 252 configured to heat the tube 251, and a housing 253 containing the tube 251 and the heater 252. The interface 250 is inserted through an opening 242a provided in the right wall 242 of the housing 240 in the SCD 200 as well as through an opening 122a provided in the left wall 122 of the housing of the GC 100. The right end of the tube 251 protrudes from the housing 253 of the interface 250, and is mounted by a first joint 221. The first joint 221 is connected by an inert-gas passage 264 used for supplying inert gas (in this case, nitrogen) to the inert-gas introduction tube 214. The first joint 221 is provided with an aperture (not shown) through which the column 140 of the GC 100 is inserted. The end in the eject-port side of the column 140 is inserted through the aperture into the in the first joint 221, passes through the tube 251 in the interface 250, and is finally inserted in the interior of the heating furnace 210, specifically to the position slightly right of the left end of the inert-gas introduction tube 214.

The left ends of the oxidizing-agent supply tube 213, the exterior combustion tube 211, and the interior combustion tube 212 protrude from the housing 216 of the heating furnace 210, and further protrude to the outside of the housing 240 from an opening 243a provided in the left wall 243 of the housing 240 in the SCD 200. In the exterior of the housing 240, the oxidizing-agent supply tube 213 is mounted, at its left end, by a second joint 222 that is connected by an oxidizing-agent passage 265 used for supplying the oxidizing agent (in this case, oxygen) to the oxidizing-agent supply tube 213. The exterior combustion tube 211 is inserted through the second joint 222 and is mounted, at its left end, by a third joint 223 that is connected by a reducing-agent passage 266 used for supplying the reducing agent (in this case, hydrogen) to the exterior combustion tube 211. The interior combustion tube 212 is inserted through the third joint 223 and is mounted, at its left end, by a transportation tube 270 that extends to the reaction cell 231.

The transportation tube 270 is formed of a flexible tube, which turns back in the exterior of the housing 240 of the SCD 200 to again enter the interior of the housing 240 through another opening 243b (see FIG. 4) provided in the left wall 243 of the housing 240, and is connected to the reaction cell 231 in the housing 240. The outer face of the left wall 243 of the SCD 200 is provided with an openable cover 271 at a position where the cover 271 is capable of covering the openings 243a and 243b, though the cover 271 is not shown in FIG. 5.

Each of the inert-gas passage 264, the oxidizing-agent passage 265, and the reducing-agent passage 266 is connected to the flow controller 237. The flow controller 237 is also connected by the oxygen passage 267 for supplying, to the ozone generator 234, oxygen to be used for generating ozone. The flow controller 237 is provided with a tube configured to connect the inert-gas passage 264 to an inert-gas supply source 261, a tube configured to connect an oxidizing-agent supply source 262 to the oxidizing-agent passage 265 and the oxygen passage 267, a tube configured to connect the reducing-agent passage 266 to a reducing-agent supply source 263, and a valve 239 configured to open and close these tubes. The flow controller 237 controls the opening and closing of the valve 239, to control the flow rates of the respective gases supplied from the inert-gas supply source 261, the oxidizing-agent supply source 262, and the reducing-agent supply source 263 respectively to the inert-gas passage 264, the oxidizing-agent passage 265 as well as the oxygen passage 267, and the reducing-agent passage 266. The inert-gas supply source 261, the oxidizing-agent supply source 262, and the reducing-agent supply source 263 may be individually provided with gas cylinders respectively filled with nitrogen, oxygen, (corresponding to the "oxidizing-agent gas" of the present invention), and hydrogen (corresponding to the "reducing-agent gas" of the present invention), for example.

Nitrogen supplied from the inert-gas supply source 261 to the inert-gas passage 264 through the flow controller 237 flows in the right end of the inert-gas introduction tube 214 through the first joint 221 and the tube 251, and flows toward the left side in the interior of the inert-gas introduction tube 214.

Oxygen supplied from the oxidizing-agent supply source 262 to the oxidizing-agent passage 265 through the flow controller 237 flows in the left end of the oxidizing-agent supply tube 213 through the second joint 222, and flows toward the right side in a space between the inner wall of the oxidizing-agent supply tube 213 and the outer wall of the exterior combustion tube 211. The oxygen that reaches the right end of the oxidizing-agent supply tube 213 flows into the inside of the exterior combustion tube 211 through a groove 211b formed in the face of the right end of the exterior combustion tube 211, and then flows toward the left side in the interior of the exterior combustion tube 211.

Hydrogen supplied from the reducing-agent supply source 263 to the reducing-agent passage 266 through the flow controller 237 flows in the left end of the exterior combustion tube 211 through the third joint 223 (corresponding to the "second supply port" of the present invention), and flows toward the right side in a space between the inner wall of the exterior combustion tube 211 and the outer wall of the interior combustion tube 212. The hydrogen that reaches the right end of the interior combustion tube 212 is drawn into the interior combustion tube 212 at this right end of the interior combustion tube, and flows toward the left side in the interior of the interior combustion tube 212.

A sample gas introduced from the eject port end of the combustion tube 140 of the GC 100 into the interior of the heating furnace 210 is mixed with the oxygen at the right end of the exterior combustion tube 211, and is oxidatively decomposed at high temperature during the flowing in the interior of the exterior combustion tube 211 toward the left. At this time, if the sample component is a sulfur compound, sulfur dioxide is generated. The gas containing the sample component that has undergone the oxidative decomposition is drawn into the interior combustion tube 212 with the hydrogen introduced from the vicinity of the left end of the exterior combustion tube 211. In the case where sulfur dioxide is contained in the sample component that has undergone the oxidative decomposition, the sulfur dioxide reacts with the hydrogen at this stage, so as to be reduced to sulfur monoxide. The gas that has passed through the interior combustion tube 212 is introduced in the reaction cell 231 through the transportation tube 270.

From the inert-gas introduction tube 214, nitrogen is supplied around the eject port end of the column 140. As effects provided by the nitrogen, the contamination of the detector due to the deterioration of the column 140 is prevented, and an oxidation-reduction reaction in the interior of the heating furnace 210 is promoted.

In order to promote the oxidation-reduction reaction in the interior of each of the exterior combustion tube 211 and the interior combustion tube 212, the interior of the heating furnace 210 is heated by the heater 215 so that an area of the heating furnace 210, in which the temperature is the highest, is at 500☐ or more (preferably 700 to 1200☐).

The gas sent from the transportation tube 270 to the reaction cell 231 is mixed with ozone inside the reaction cell 231. At this time, chemiluminescence generated by the reaction between the sulfur monoxide and ozone is detected by the light-emission detector 233 including a photomultiplier tube and other components, through the optical filter 232. The ozone is generated in the ozone generator 234 using oxygen supplied from the oxidizing-agent supply source 262 through the oxygen passage 267, and is supplied to the reaction cell 231. At this time, the flow rate of the oxygen to be supplied to the ozone generator 234 through the oxygen passage 267 is also controlled by the flow controller 237. In the present invention, the ozone generator 234, the flow controller 237, the oxidizing-agent supply source 262, and the oxygen passage 267 constitute an ozone supply unit. The ozone scrubber 235 and the vacuum pump 236 are provided downstream of the reaction cell 231. The gas inside the reaction cell 231, which is sucked by the vacuum pump 236, is discharged to the outside as exhausted gas, after ozone in the gas is removed by the ozone scrubber 235.

Detection signals from the light-emission detector 233 are sent to the controller/processor 300, and the concentration of the sulfur compound in the sample gas is calculated based on the detection signals in the controller/processor 300. The controller/processor 300 is embodied by a microcomputer including an input-output circuit for performing communication with CPU, ROM, RAM and external peripheral devices, for example. Calculation processing in accordance with a control program and a control parameter which are stored in the ROM, for example, is executed mainly by the CPU, so that processing of the detection signals is performed and the operation of each unit is controlled. Specifically, the heater 215 of the heating furnace 210, the heater 252 of the interface 250, the light-emission detector 233, the ozone generator 234, the vacuum pump 236, the flow controller 237, and other devices are controlled. The controller/processor 300 is connected by an input device 320 including a keyboard, mouse, touch panel, or operation buttons, for inputting instructions from an operator.

FIG. 2 shows a signal receiving unit 311, a shutdown functioning unit 312, and a temperature determining unit 313, which connect to the controller/processor 300. These units work as functional means for enabling the shutdown operation, which is the distinguishing operation of the SCD 200, and are enabled as software by executing shutdown programs stored in a memory of the controller/processor 300, by the CPU of the controller/processor 300.

Figure 6:
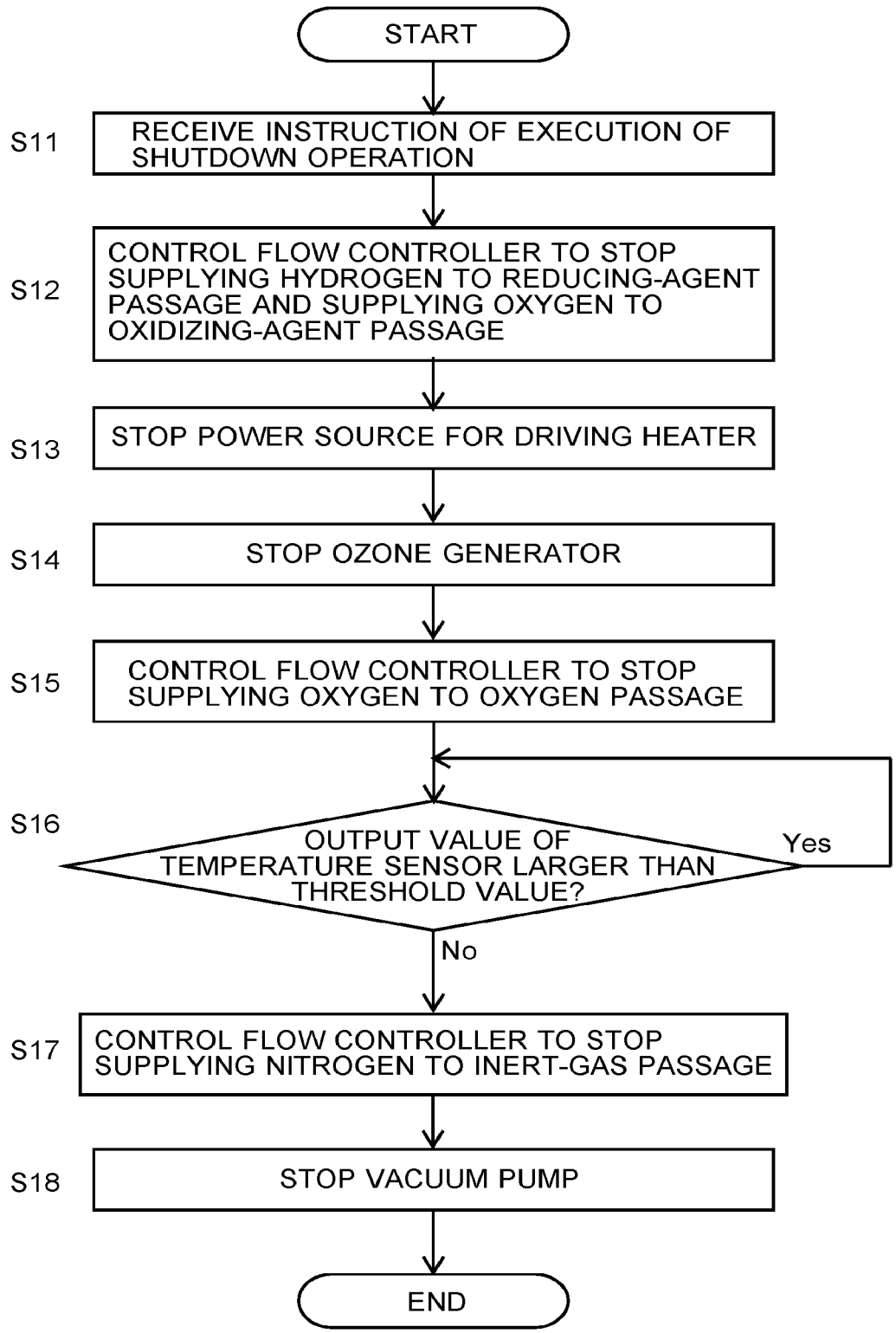
FIG. 6 is a flowchart showing the shutdown operation in the SCD.

Hereinafter, procedures of the shutdown operation enabled by the function means are described, with reference to the flowchart of FIG. 6.

When all processing from the introduction of the sample gas from the column 140 of the GC 100 into the interior of the heating furnace 210 to the calculation of the concentration of the sulfur compound in the sample gas in the controller/processor 300 is terminated, an operator inputs the instruction of executing the shutdown operation to the controller/processor 300, using the input device 320. When the instruction is received by the signal receiving unit 311 (Step S11), the shutdown operation is started under the control of the shutdown functioning unit 312.

In the shutdown operation, the flow controller 237 is first controlled by the controller/processor 300, to sequentially stop the supply of hydrogen from the reducing-agent supply source 263 to the reducing-agent passage 266, and the supply of oxygen from the oxidizing-agent supply source 262 to the oxidizing-agent passage 265 (Step S12).

Then, the power source that drives the heater 215 of the heating furnace 210 is stopped by the controller/processor 300 (Step S13). Thereafter, the ozone generator 234 is stopped (Step S14). When a predetermined time period (for example, one minute) has passed after the stop of the ozone generator 234, the flow controller 237 is controlled by the controller/processor 300, to stop the supply of oxygen to the oxygen passage 267 (Step S15), so as to stop the supply of the oxygen to the ozone generator 234 that has already been stopped.

Thereafter, when a detection signal of the temperature sensor 211a is inputted in the controller/processor 300, the temperature determining unit 313 determines whether the detection signal is more than or equal to the predetermined threshold value (Step S16). If it is determined that the detection signal of the temperature sensor 211a is lower than the predetermined threshold value (specifically, the temperature of the interior of the exterior combustion tube 211 is lower than the predetermined temperature-determination value, e.g., 50☐) (No in Step S16), the flow controller 237 is controlled by the controller/processor 300, so as to stop the supply of nitrogen to the inert-gas passage 264 (Step S17). In addition, the vacuum pump 236 is stopped (Step S18). With these operations, the degree of vacuum of the interior of the reaction cell 231 is lowered (the pressure increases).

With these operations, the shutdown operation is terminated. Accordingly, there is no need for the operator to manually conduct the operation of sequentially stopping each of the units for the shutdown operation.

If the supply of inert gas to the exterior combustion tube 211 is stopped or the vacuum pump 236 is stopped without adequately cooling the interior of the exterior combustion tube 211, it is concerned that parts of the heating furnace 210 is contaminated, or the column connected to the SCD 200 is contaminated. However, according to the present embodiment, the temperature of the interior of the exterior combustion tube 211 is detected by the temperature sensor 211a, and the flow controller 237 is controlled after the detected temperature becomes lower than the determination value, to stop the supply of nitrogen to the inert-gas passage 264 and to stop the vacuum pump 236. Thus, the present embodiment is free from such concerns.

If the supply of oxygen to the ozone generator 234 is stopped in the state where the ozone generator 234 is operated, it is concerned that the ozone generator 234 is damaged. However, according to the present embodiment, the ozone generator 234 is first stopped, and then the flow controller 237 is controlled, to stop the supply of oxygen to the oxygen passage 267. Thus, the present embodiment is free from such a concern.

A notifying means (for example, a buzzer, lamp, and other alerts) configured to notify the operator of the termination of the shutdown operation may be provided. With the means, the operator can recognize the termination of the shutdown operation.

Although the embodiment of the present invention is described with specific examples, the present invention is not limited to such an embodiment, and an appropriate change in the scope of the present invention is acceptable. For example, in the aforementioned embodiment, oxygen is used as the oxidizing agent. However, air can be used instead of oxygen. In addition, nitrogen is used as the inert gas in the aforementioned embodiment. However, another inert gas (for example, helium) can be used. The supply of inert gas is not indispensable for the operation of the SCD. Accordingly, the SCD according to the present invention may not include the inert-gas supply source 261, the inert-gas passage 264, the inert-gas introduction tube 214, or other devices.

Figure 7:
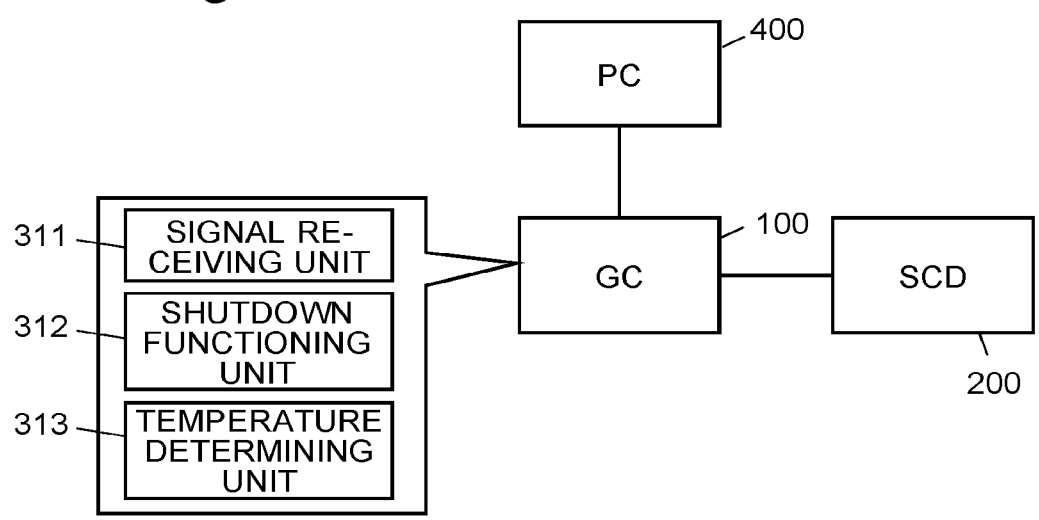
FIG. 7 is a diagram showing another configuration example of the GC system including the SCD according to the present invention.

Furthermore, programs for executing the respective signal receiving unit 311, shutdown functioning unit 312, and temperature determining unit 313 are loaded in a microcomputer (controller/processor 300) installed inside the SCD, in the aforementioned embodiment. However, the programs may be stored in the microcomputer (FIG. 7) inside the GC 100 connected to the SCD 200.

In the aforementioned embodiment, an operator inputs the instruction of starting the shutdown operation using the input device 320 provided in the SCD 200. However, the present invention is not limited to such an embodiment, and the operator may issue the instruction of executing the shutdown operation using the operation panel 132 of the GC 100. Instead of the configuration in which the operator operates the input device to issue the instruction of starting the shutdown operation, processing in which a signal of the instruction of starting the shutdown operation of the SCD 200 is outputted may be incorporated in a program for controlling the operation of the GC 100, so that the shutdown operation is automatically started in the SCD 200 at an appropriate timing after the start of the operation of GC 100. Such a program may be loaded in the microcomputer inside the GC 100. The program relating to the present invention is not necessarily a single program, and may be incorporated in a program for controlling the SCD 200 or a program for controlling the GC 100.

Although the present invention is applied to the SCD including a horizontal-type heating furnace (i.e., a heating furnace containing in its interior a combustion tube extending in the horizontal direction) in the aforementioned embodiment, the present invention is not limited to be applied to such a horizontal-type heating furnace. The present invention can also be applied to an SCD provided with a vertical-type heating furnace (i.e., a heating furnace containing in its interior a combustion tube extending in the vertical direction) as disclosed in Patent Literature 1.

Although four passages are controlled by a single flow controller in the aforementioned embodiment, a single passage may be controlled by a single flow controller, or two passages may be controlled by a single flow controller.

The order of the shutdown operation described in the aforementioned embodiment is an example, and this order is not indispensable. For example, it is only required for the ozone generator 234 to be stopped before the stop of supplying oxygen to the oxidizing-agent passage 267. Accordingly, the ozone generator 234 may be stopped immediately after the execution of the shutdown operation has been instructed.

REFERENCE SIGNS LIST

100 . . . Gas Chromatograph
200 . . . Sulfur Chemiluminescence Detector
210 . . . Heating Furnace
211 . . . Exterior Combustion Tube
212 . . . Interior Combustion Tube
213 . . . Oxidizing-Agent Supply Tube
214 . . . Inert-Gas Introduction Tube
215 . . . Heater
216 . . . Housing
231 . . . Reaction Cell
233 . . . Light-Emission Detector
234 . . . Ozone Generator
235 . . . Ozone Scrubber
236 . . . Vacuum Pump
300 . . . Controller/Processor
311 . . . Signal Receiving Unit
312 . . . Shutdown Functioning Unit
313 . . . Temperature Determining Unit
400 . . . Personal Computer

The invention claimed is:

1. A sulfur chemiluminescence detector comprising:
a heating furnace including a gas passage that has a first supply port and a second supply port positioned downstream of the first supply port, and a heating means configured to heat the gas passage;
an oxidation-reduction gas supply unit configured to supply, to the gas passage, an oxidizing-agent gas through the first supply port and a reducing-agent gas through the second supply port;
a reaction cell configured to make a sample gas that has passed through the gas passage react with ozone;
an ozone supply unit configured to supply the ozone into the reaction cell;
a vacuum pump connected to the reaction cell;
a photodetector configured to detect light generated inside the reaction cell;
a signal receiving unit configured to receive a shutdown signal for starting a shutdown operation; and
a shutdown functioning unit configured to control the oxidation-reduction gas supply unit, the heating means, the ozone supply unit, and the vacuum pomp, to automatically stop a supply operation for supplying the reducing-agent gas and the oxidizing-agent gas by the oxidation-reduction gas supply unit, a heat operation for heating the gas passage by the heating means, a supply operation for supplying the ozone by the ozone supply unit, and an evacuation operation by the vacuum pump, in response to the shutdown signal being received by the signal receiving unit.

2. The sulfur chemiluminescence detector according to claim 1, further comprising:
a temperature sensor configured to detect a temperature of an interior of the gas passage; and
a temperature determining unit configured to determine whether the temperature of the interior of the gas passage is lower than a predetermined temperature determination value; wherein the shutdown functioning unit is configured to stop the evacuation operation by the vacuum pump after the supply operation for supplying the ozone by the ozone supply unit is stopped, in response to determination, by the temperature determining unit, that the temperature of the interior of the gas passage is lower than the temperature determination value.

3. The sulfur chemiluminescence detector according to claim 1, wherein the ozone supply unit includes an ozone generator, and an oxygen supply unit configured to supply oxygen for generating the ozone to the ozone generator, and the shutdown functioning unit is configured to stop the oxygen supply unit after stopping the ozone generator, so as to stop the supply operation for supplying the ozone by the ozone supply unit.

4. A non-transitory computer readable medium recording a program for a sulfur chemiluminescence detector, the program being used for controlling an operation of the sulfur chemiluminescence detector that includes:

a heating furnace including a gas passage that has a first supply port and a second supply port positioned downstream of the first supply port, and a heating means configured to heat the gas passage;

an oxidation-reduction gas supply unit configured to supply, to the gas passage, an oxidizing-agent gas through the first supply port and a reducing-agent gas through the second supply port;

a reaction cell configured to make a sample gas that has passed through the gas passage react with ozone;

an ozone supply unit configured to supply the ozone into the reaction cell;

a vacuum pump connected to the reaction cell;

a photodetector configured to detect light generated inside the reaction cell, wherein the program causes a computer to function as:

a signal receiving unit configured to receive a shutdown signal for starting a shutdown operation; and a shutdown functioning unit configured to control the oxidation-reduction gas supply unit, the heating means, the ozone supply unit, and the vacuum pomp, to automatically stop a supply operation for supplying the reducing-agent gas and the oxidizing-agent gas by the oxidation-reduction gas supply unit, a heat operation for heating the gas passage by the heating means, a supply operation for supplying the ozone by the ozone supply unit, and an evacuation operation by the vacuum pump, in response to the shutdown signal being received by the signal receiving unit.

5. The non-transitory computer readable medium recording a program for a sulfur chemiluminescence detector, according to claim 4, wherein the sulfur chemiluminescence detector includes a temperature sensor configured to detect a temperature of an interior of the gas passage, the program for the sulfur chemiluminescence detector further causes the computer to function as:

a temperature determining unit configured to determine whether the temperature of the interior of the gas passage is lower than a predetermined temperature determination value; and the shutdown functioning unit configured to stop the evacuation operation by the vacuum pump after the supply operation for supplying the ozone by the ozone supply unit is stopped, in response to determination, by the temperature determining unit, that the temperature of the interior of the gas passage is lower than the temperature determination value.

6. The non-transitory computer readable medium recording a program for a sulfur chemiluminescence detector, according to claim 4, wherein the sulfur chemiluminescence detector includes the ozone supply unit that includes an ozone generator and an oxygen supply unit configured to supply oxygen for generating the ozone to the ozone generator, and the shutdown functioning unit is configured to stop the oxygen supply unit after stopping the ozone generator, so as to stop the supply operation for supplying the ozone by the ozone supply unit.

* * * * *